(12) United States Patent
Lorscheider

(10) Patent No.: US 9,932,083 B1
(45) Date of Patent: Apr. 3, 2018

(54) CYCLE E-STEM

(71) Applicant: Brent Lorscheider, Eugene, OR (US)

(72) Inventor: Brent Lorscheider, Eugene, OR (US)

( * ) Notice: Subject to any disclaimer, the term of this patent is extended or adjusted under 35 U.S.C. 154(b) by 47 days.

(21) Appl. No.: 15/195,750

(22) Filed: Jun. 28, 2016

(51) Int. Cl.
*B62K 21/12* (2006.01)
*B62K 21/20* (2006.01)
*B62K 21/14* (2006.01)

(52) U.S. Cl.
CPC .............. *B62K 21/20* (2013.01); *B62K 21/14* (2013.01)

(58) Field of Classification Search
CPC ......... B62K 21/20; B62K 21/14; B62K 21/12
See application file for complete search history.

(56) References Cited

U.S. PATENT DOCUMENTS

| | | |
|---|---|---|
| 4,939,950 A | 7/1990 | Girvin |
| 5,181,436 A | 1/1993 | Lai |
| 5,186,074 A | 2/1993 | Arnold |
| 5,189,074 A | 2/1993 | Arnold |
| 5,220,851 A | 6/1993 | Flechel |
| 5,241,881 A | 9/1993 | Chen |
| 5,253,544 A | 10/1993 | Allsop et al. |
| 5,285,697 A | 2/1994 | Clausen |
| 5,405,159 A | 4/1995 | Klein |
| 5,511,441 A | 4/1996 | Arai |
| 5,511,444 A | 4/1996 | Clausen et al. |
| 5,586,780 A | 12/1996 | Klein |
| 5,660,406 A | 8/1997 | Meuze |
| 5,678,457 A | 10/1997 | Hals |
| 5,921,145 A | 7/1999 | Muser |
| 6,988,740 B2 | 1/2006 | Bobrovniczky |
| 7,192,044 B2 | 3/2007 | Ueno |
| 2008/0203699 A1 | 8/2008 | Truchinski |
| 2014/0116195 A1 | 5/2014 | Gu |
| 2015/0059518 A1* | 3/2015 | Feng ...................... B62K 21/12 74/551.1 |
| 2017/0043838 A1 | 2/2017 | Ahnert et al. |

FOREIGN PATENT DOCUMENTS

| | | | | |
|---|---|---|---|---|
| DE | 9306261 U1 * | 7/1993 | ............. | B62K 21/14 |
| DE | 4344558 A1 * | 6/1995 | ............. | B62K 21/14 |

* cited by examiner

*Primary Examiner* — Vicky A Johnson

(57) ABSTRACT

An elastomerically cushioned cycle stem, referred to as an e-stem, connects a cycle handlebar to a cycle fork steerer tube. The e-stem has a rigid interchangeable swingarm that rotates, i.e., pivots about an axis located behind a steerer tube bore of the base. A fastener rotationally secures the swingarm to the base and clamps the base to the steerer tube. An interchangeable elastomeric block, engaged by the base and swingarm, absorbs impacts from the road or trail, as the swingarm pivots. The base sides provide interior rotational abutments to the arms of the swingarm, the abutments buttress the pivoting swingarm to provide lateral rigidity of the swingarm relative to the base. The e-stem is adjusted using a plurality of swingarm configurations to alter the stem length and offset, and using a plurality of elastomeric block properties.

13 Claims, 4 Drawing Sheets

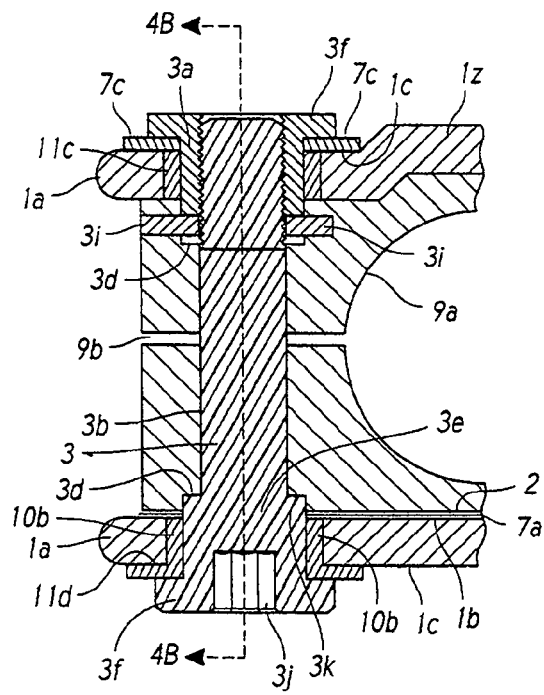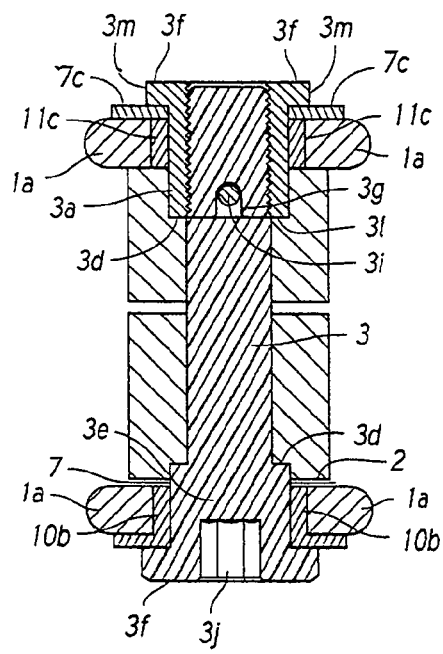
FIG. 4A        FIG. 4B
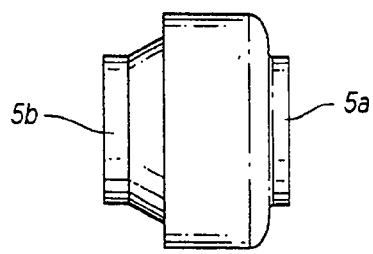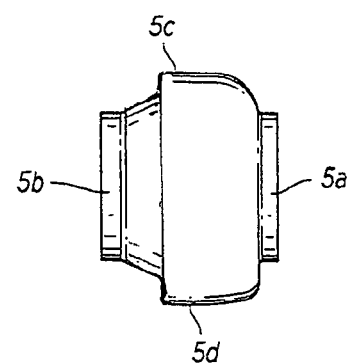
FIG. 5A        FIG. 5B

CYCLE E-STEM

BACKGROUND

Cycles typically use a stem to connect a handlebar to a cycle fork, the stem connecting the handlebar to a steerer tube of the cycle fork, the fork having an attached cycle wheel. The cycle wheel absorbs impacts from the road or trail, the impacts transmitted to a cycle rider through the forks, stem and handlebars. The prior art utilizes various stem designs to isolate and cushion the rider from said impacts including stems with linear slide designs, stems with pivoting designs at a rotation point, and stems with articulating arm designs. These designs have disadvantages including complexity, weight, steering vagueness due to lack of lateral rigidity, and fixed stem geometry, i.e., offset lengths and angles. A simple solution is needed to provide an adjustable stem that absorbs vertical impacts and has lateral rigidity for accurate steering.

An inventive elastomeric stem is disclosed, the stem has a base rigidly attached to the steerer tube, the base has a rotationally connected swingarm, in other words a pivoting swingarm. The swingarm has a handlebar mount to receive and secure the handlebar. The swingarm pivots and rotates about a horizontal transverse axis located behind the stem. The rearward pivot location permits the use of base side facets that abut swingarm inner facets to buttress against lateral movement of the pivoting swingarm thereby providing lateral rigidity. An elastomeric block is engaged by the base and the swingarm thereby fixing an original rotational position of the swingarm relative to the base. The elastomeric block is deformed by and cushions the swingarm rotation relative to the base when an external impact force is applied. The buttressed and cushioned swingarm of the e-stem provides a laterally rigid connection between the fork and handlebar mount while absorbing road impacts and vibrations transmitted from a wheel of the cycle fork to the steerer tube.

SUMMARY

An inventive elastomerically cushioned stem, referred to as an "e-stem", is disclosed herein for cycles, said e-stem connects a cycle handlebar to a cycle fork steerer tube. The e-stem has a rigid swingarm rotationally connected to a base, the swingarm having a handlebar mount at a forward end and two rigid arms at a rear end, the arms having journaled swingarm bearings, the bearings connecting the swingarm to the base with a fastener, the base clamped to a steerer tube by the fastener, the fastener received by a transverse base fastener bore located behind the steerer tube. An elastomeric block is located and fixed between the base and the swingarm, the block deforms elastically as the swingarm rotates, i.e., as the swingarm pivots, the block deformation cushioning and absorbing the swingarm rotation and attendant handlebar mount against road impacts. Lateral base side facets engage and buttress swingarm inner facets restricting swingarm movement to a plane substantially perpendicular to the base fastener bore.

BRIEF DESCRIPTION OF THE DRAWINGS

A more particular description of the present disclosure will be rendered by reference to specific embodiments thereof that are illustrated in the drawings. It is appreciated that these drawings depict only typical embodiments of the invention and are therefore not to be considered limiting of its scope. Example embodiments of the invention will be described and explained with additional specificity and detail through the use of the accompanying drawings in which:

FIG. 4A is a partial top view of an assembled e-stem embodiment utilizing bushing bearings for the swingarm bearings.

FIG. 4B is a sectional view of FIG. 4A.

FIG. 5A is a top view of the elastomeric block of the embodiment of FIG. 1A.

FIG. 5B is a side view of the elastomeric block of the embodiment of FIG. 1A.

DETAILED DESCRIPTION

Figure 1A:
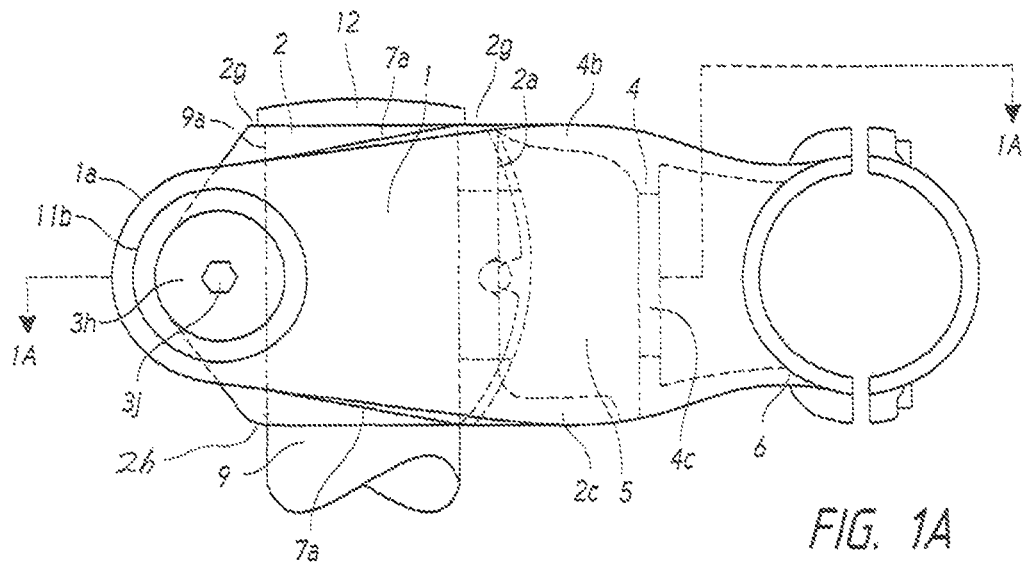
FIG. 1A is a side view of an assembled e-stem.
Figure 1B:
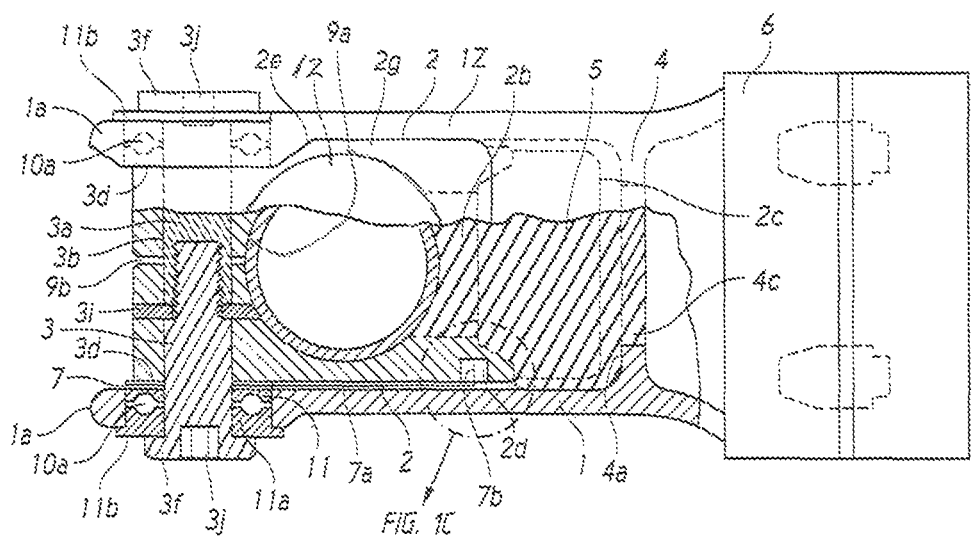
FIG. 1B is a combined top view and partial sectional view of FIG. 1A.

FIGS. 1A and 1B show an assembled e-stem embodiment configured with flanged ball bearing assemblies, the assembled e-stem mounted on a steerer tube of the prior art. The e-stem is comprised of a base, a swingarm rotationally connected to the base with a fastener, an elastomeric block located in front of the base, swingarm bearings, and a washer.

FIGS. 1A, 1B, 2A and 2B show the base having: a split steerer tube bore 9a receiving a steerer tube 9 of the prior art; a base top facet 2g and base bottom facet 2h are configured to receive the abutment of a stem top cap 12 of the prior art; a horizontal transverse base fastener bore 3b; a base forward facet 2a having a base middle feature 2b; a base lower feature 2c; lateral base side facets 2; and base side facet feature 2d.

FIGS. 1A, 1B, 3A and 3B show the swingarm having: a transverse handlebar mount 6 at the forward end, the mount joined through a tubular structure to a swingarm bridge 4 with two rigid arms, 1 and 1z, extending rearward from said bridge; the swingarm bridge having a bridge inner facet 4a and a bridge upper feature 4b, the bridge inner facet 4a having a bridge middle feature 4c; the two arms each having an arm end 1a, an arm outer facet 1c, and an arm inner facet 1b; each arm end having a journaled swingarm bearing 10a, the bearings each having a bearing flange 11b abutting the arm outer facet 1c; and an inwardly offset arm 1z and a straight arm 1.

Figure 3A:
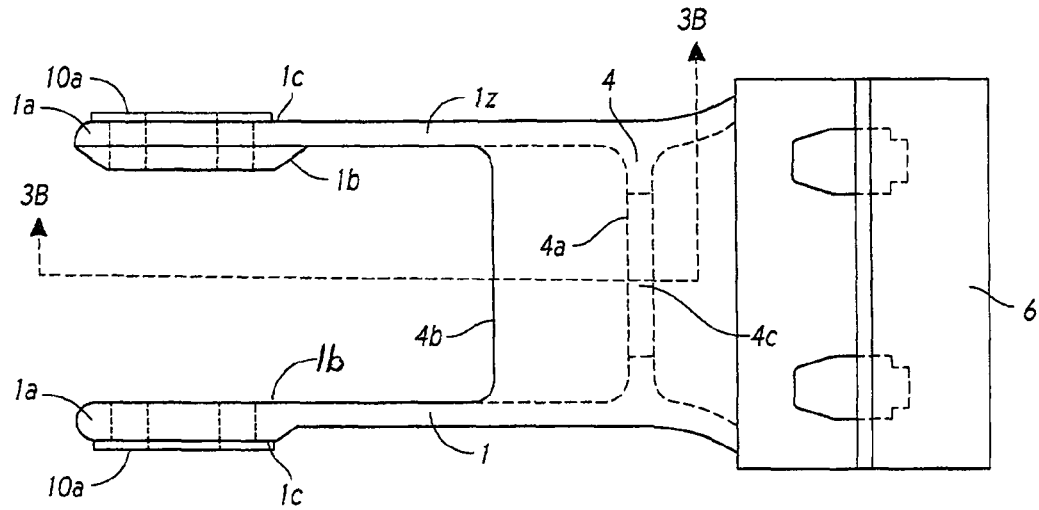
FIG. 3A is a top view of the swingarm of the embodiment of FIG. 1A.
Figure 3B:
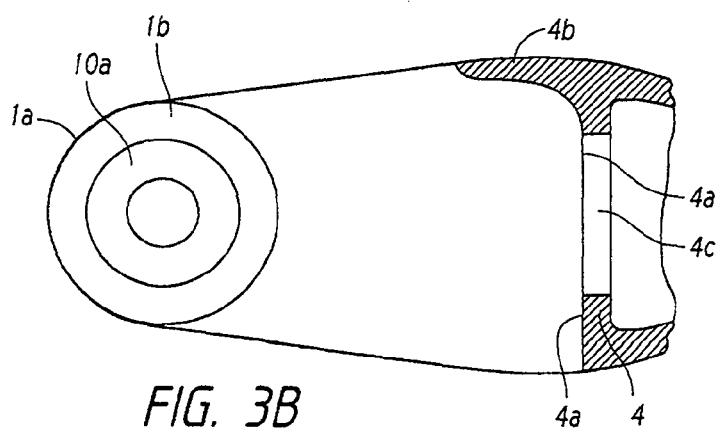
FIG. 3B is a partial sectional view of FIG. 3A.

For illustrative purposes only, FIGS. 3A and 3B show the swingarm of the embodiment of FIG. 1A, the swingarm having a handlebar mount 6 at the forward end joined through a tubular structure to a swingarm bridge 4, the bridge having two rigid arms extending rearward; each arm having an arm end 1a, each arm end having a journaled swingarm ball bearing 10a.

FIGS. 1A and 1B show an elastomeric block 5. For illustrative purposes only, FIGS. 5A and 5B show the elastomeric block having a rear feature 5b, a forward feature 5a, a lower feature 5d and an upper feature 5c.

The swingarm is rotationally connected to the base, the arms of the swingarm straddle the base, and the inner facets of the arms 1b are adjacent to and abut the respective base side facets 2. The journaled swingarm bearings and fastener attach the swingarm to the base, the swingarm bearings receiving the fastener. The journaled swingarm bearings are configured to restrict lateral motion of the arms and allow rotation of the arms about the base fastener bore axis, the swingarm bearings transferring opposing inward axial forces from the fastener, the inward forces transferred through the swingarm bearing to the respective base clamp shoulders 3d thereby pinching the base steerer tube bore 9a, the pinched steerer tube bore clamping the steerer tube 9.

Figure 6:
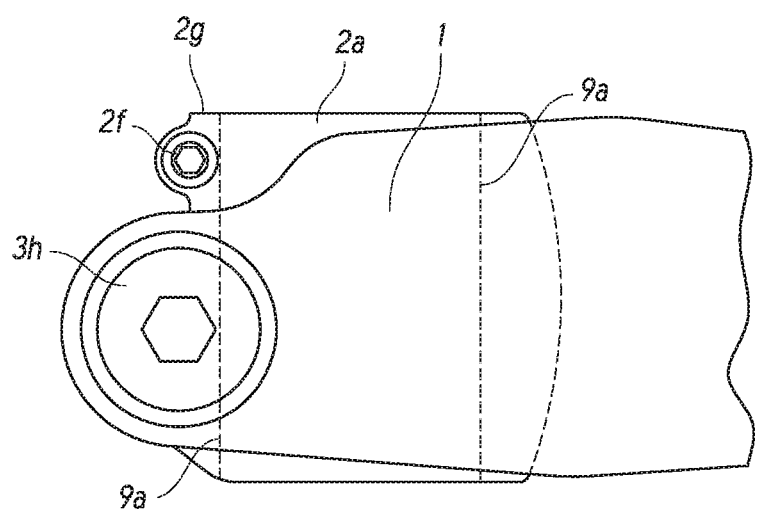
FIG. 6 is a partial side view of an assembled e-stem embodiment utilizing an optional clamp bolt in addition to a fastener.

The base is clamped to the fork steerer tube 9a with the fastener, the fastener having two opposing end elements, each end element having cylindrical forms to apply the inward axial force and to laterally and rotationally fix the swingarm to the base. The base may have optional pinch bolts 2f of the prior art as shown in FIG. 6, the optional pinch bolts providing clamping forces on the steerer tube in addition to the clamp force provided by the fastener.

The base side facets are rotationally developed arc forms, each arc form having a center of rotation at the base fastener center axis. Each arm inner facet is shaped to mate and abut the respective base side facet, the respective facets able to rotate relative to each other, the rotation centered about the base fastener center axis.

Each arm inner facet contacts and rotationally glides against each adjacent base side facet, the rotation assisted by glide surfaces, the glide surfaces located between or on the arm inner facets and respective base side facets, the glide surfaces reducing the friction between the arm inner facets and the base side facets thereby resisting rotational thrust loads, said glide surfaces having sufficient hardness to resist wear from repetitive rotation of the swingarm relative to the base. For illustrative purposes only, FIGS. 1A and 1B show an embodiment having a glide surface consisting of an inner washer 7 with an inner washer extension 7a, the inner washer having a low friction surface with sufficient hardness to resist wear from repetitive rotation of the swingarm relative to the base.

The bearings, base side facets, arm inner facets and glide surfaces are configured to substantially restrict swingarm movements in all directions except for rotation about the base fastener center axis.

For illustrative purposes only, the inventive embodiments shown in the drawings utilize two types of swingarm bearings, ball bearing assemblies of the embodiment shown in FIGS. 1A and 1B, and bushing bearings of the embodiment shown in FIGS. 4A and 4B. A plurality of other bearing types could also be utilized. The bearings, fastener and base clamp shoulders are configured to laterally fix and rotationally connect the swingarm to the base while transferring the axial forces from the fastener thru the bearings to the respective base clamp shoulders in order to pinch the base and steerer tube bore 9a.

The fastener has two opposing end elements, one element at each respective swingarm bearing, each end element comprised of cylindrical forms configured to support and laterally fix each respective swingarm bearing, each end element configured to apply the respective inward axial force, the fastener and the respective swingarm bearings configured to transmit each respective inward axial force to the respective base clamp shoulder, the opposing axial forces pinching the steerer tube bore.

For illustrative purposed only, the embodiment of FIGS. 1A and 1B show a fastener having end elements configured with fastener caps 3f, each cap abutting and applying the inward axial force against the respective bearing 10a, the flange 11b of each bearing abutting the respective arm outer facet laterally fixing the bearing and respective arm, the respective inward clamping force transferred thru the respective bearing inner race 11 to the respective base shoulder 3d.

For illustrative purposed only the embodiment of FIGS. 4A and 4B show a fastener having end elements configured to apply the inward axial forces, from a bolt step 3k and fastener nut step 3l, to the respective base clamp shoulder 3d, the fastener also configured with the fastener caps 3f, each cap rotationally abutting a respective flange of the bushing bearing 11d, the respective abutments laterally fixing the bearings and swingarm. It is apparent to anyone skilled in the art, that the flange of the bushing bearing could be a separate outer washer 7c.

Figure 1C:
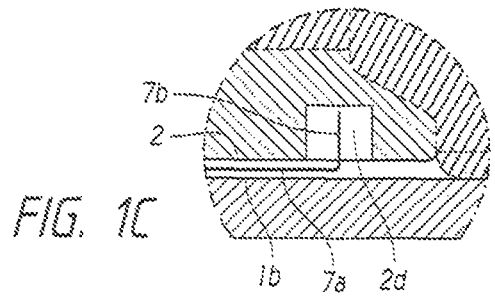
FIG. 1C is a detailed view of a portion of FIG. 1B.
Figure 2A:
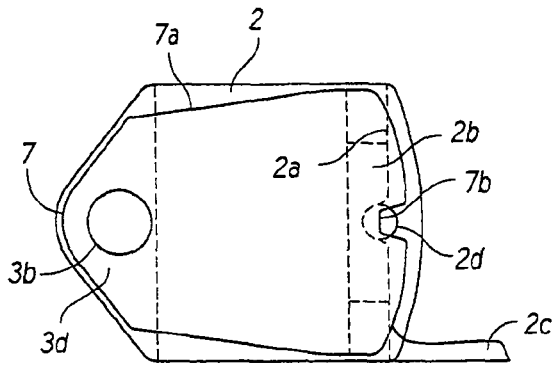
FIG. 2A is a side view of the right side of the base and inner washer of the embodiment of FIG. 1A
Figure 2B:
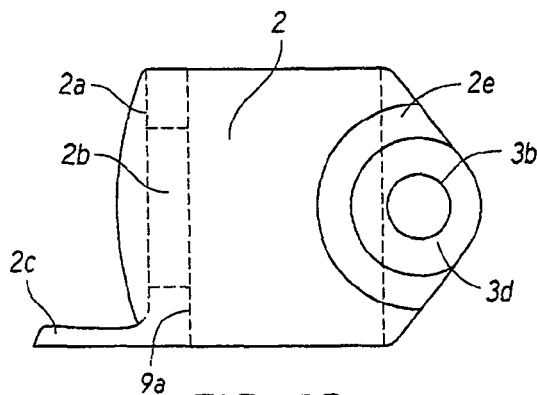
FIG. 2B is a side view of the left side of the base of the embodiment of FIG. 1A.

For illustrative purposed only, the embodiment of FIGS. 1B and 1C show a glide surface comprised of an inner washer 7 having an inner washer extension 7a, located between the base side facet 2 and each arm inner facet 1b, the inner washer with inner washer extension serving as the glide surface, said surface rotationally fixed through engagement of base side facet feature 2d with the inner washer feature 7b. It is apparent to anyone skilled in the art, that the glide surface(s) could be accomplished thru a plurality of ways including, but not limited to: hardened low friction surface treatments to the arm inner facets and/or base side abutments; hardened low friction insets, coverings, shields, or attachments to the arm inner facets and/or base side abutments; and separate low friction glide plates rotationally fixed to either the base or swingarms.

It is apparent to anyone skilled in the art that the swingarm bearings, the fastener, the inner and outer washer, the glide surfaces and the base clamp shoulders could have a plurality of configurations to: rotationally attach the swingarm to the base, to apply an inward clamping force to the base thereby pinching it, and to laterally fix the position of the swingarm to the base.

For illustrative purposes only, the embodiments shown in the drawings have fasteners with various end element configurations to apply the respective inward forces while rotationally and laterally securing the swingarm to the base. FIGS. 1A and 1B show end elements configured with a fastener nut 3a receiving a fastener bolt 3, the joined fastener forming a cylindrical body received by the bearings, the joined fastener having fastener caps 3f at the distal ends, each cap laterally fixing the respective bearing while applying a respective inward axial force, thru the bearings, against the respective base fastener shoulders 3d. The embodiment of FIGS. 4A and 4B show end elements configured with a fastener pinch bolt 3 received by a fastener nut 3a, the bolt and nut each having a fastener step, 3k and 3l respectively, each step applying an inward axial force against the respective base clamp shoulder 3d, the fastener bolt and fastener nut each having a fastener cap 3f, each cap configured to abut and laterally fix the respective bearing, the fastener nut 3a and the fastener bolt 3 received by the respective bushing bearings.

For illustrative purposes only, the embodiments of FIGS. 1A, 1B, 4A and 4B show fastener end elements configured with a fastener bolt 3 received by a fastener nut 3a, the fastener bolt having a fastener bolt feature, the feature configured to engage a tool of the prior art to apply a torque to the fastener bolt. For illustrative purposes only, the fastener bolt feature of these embodiments is a hex socket 3j. The fastener nut 3a has a fastener nut primary feature rotationally engaging a base fastener engagement feature, the features rotationally fixing the fastener nut to the base as the fastener bolt is torqued. For illustrative purposes only, the fastener nut primary feature is a fastener nut notch 3g, the base fastener engagement feature is a base pin 3i, the notch engaging the pin to rotationally fix the fastener nut as the fastener bolt is torqued.

The fastener nut has a redundant secondary feature configured to rotationally engage a tool of the prior art. For illustrative purposes only, the fastener end elements of the embodiment of FIGS. 1A and 1B has a fastener nut secondary feature consisting of a hex socket 3j and the embodiment of FIGS. 4A and 4B has a fastener nut secondary feature consisting of two opposing fastener nut flats 3m.

It is apparent to anyone skilled in the art, that the fastener and fastener end elements could be configured in a plurality of ways to accomplish the task of applying an inward force from the fastener and to have various engagement features for receiving torque from a tool of the prior art. It is further apparent to anyone skilled in the art, that the fastener, the fastener end elements, the bearings, the bearing journaling, the base clamp shoulders, and the arm ends could have a plurality of configurations able to transfer the inward clamping forces while providing the rotational laterally-fixed connection of the swingarm to the base.

The base of the e-stem may optionally have one or more clamp bolts of the prior art, the optional clamp bolt(s) providing clamping force(s) on the steerer tube in addition to the clamping force provided by the fastener. It is apparent to anyone skilled in the art, that the utilization of optional clamp bolts of the prior art could provide a uniform clamp force along the steerer tube depending on the length of the base steerer tube bore and placement of the fastener. For illustrative purposes only, FIG. 6 shows an embodiment with a fastener 3h located near the bottom of the base and an optional clamp bolt comprised of a pinch bolt 2f located near the top of the base.

For illustrative purposes only, the embodiment shown in the drawings has a straight arm and an inwardly offset arm, the arms each having an inner facet of a rotationally formed arc shape, each inner facet mating and abutting the adjacent base side facet. It is apparent to anyone skilled in the art, the base and swingarm facets could be asymmetrical, as suggested in FIGS. 1A and 1B, or symmetrical.

The engaged elastomeric block has primary engagements with the base and swingarm, and secondary engagements with the base and swingarm, the primary engagements affecting downward or upward swingarm position and rotation relative to the base, the secondary engagements affecting downward swingarm position and rotation relative to the base. The engaged block is elastically deformed by rotation of the swingarm relative to the base.

For illustrative purposed only, FIGS. 1A and 1B show an embodiment having primary engagement features consisting of an elastomeric block 5, the block located between the base forward facet 2a and the bridge inner facet 4a, the base forward facet having a base middle feature 2b and the swingarm bridge inner facet having a bridge middle feature 4c, the base and swingarm middle features engaging a rear feature 5b and a forward feature 5a of the elastomeric block, respectively, the engagements fixing the relative rotational position of the base and swingarm respectively in both rotational directions, the engagements affecting downward or upward swingarm rotation, relative to the base. FIGS. 5A and 5B show the forward feature 5a, rear feature 5b, of the elastomeric block.

For illustrative purposed only, FIGS. 1A and 1B show an embodiment having secondary engagement features consisting of an elastomeric block 5, the block located between a base forward facet 2a and a bridge inner facet 4a, the block also located between a lower feature 2c of the base and an upper feature 4b of the swingarm bridge, said features engaging respective lower and upper features, 5d and 5c, of the elastomeric block, the engagements fixing the relative rotational position of the base and swingarm in the downward rotational direction, the engagements affecting downward swingarm rotation direction, relative to the base. FIGS. 5A and 5B show the upper feature 5c, and lower feature 5d of the elastomeric block.

It is apparent to anyone skilled in the art, the primary engagements of the elastomeric block with the base and swingarm could be configured in a plurality of configurations that would affect downward or upward swingarm position and rotation. It is apparent to anyone skilled in the art, the secondary engagements of the elastomeric block with the base and swingarm could be configured in a plurality of configurations that would affect downward swingarm rotation.

The e-stem is assembled by positioning and aligning the base, swingarm, and elastomeric block, and any utilized washers of a particular embodiment, the positioned parts receive the fastener.

The assembled e-stem receives the steerer tube of a bicycle fork, the e-stem positioned and aligned, the fastener and any optional base pinch bolts torqued, the fastener configured to laterally fix the swingarm bearings to the base, the fastener also configured to apply opposing inward clamping forces to the respective base clamp shoulders, the forces from the fastener and any optional base pinch bolts pinching the base and steerer tube bore, the pinched bore clamping the fork steerer tube to the base, the e-stem now connected to the fork steerer tube.

The assembled and installed e-stem results in a base rigidly attached to the steerer tube, the base having a laterally rigid rotating swingarm, the swingarm rotation resisted and rebounded by the elastomeric block, the swingarm having a handlebar mount that moves through an arc when the elastomeric block is deformed by a force applied by the fork steerer tube to the handlebar mount, or by a force applied to the handlebar mount to the fork steerer tube.

The invention claimed is:

1. An elastomerically cushioned cycle stem, referred to as an e-stem, connects a cycle handlebar to a steerer tube of a cycle fork, the e-stem comprised of:

a pinchable base with a split vertical steerer tube bore, the bore receives the steerer tube, a pinched base secures the base to the steerer tube, the base has a horizontal transverse base fastener bore located rearward of the steerer tube bore, a swingarm with a transverse handlebar mount at a forward end and two arms at a rearward end, each arm has a journaled swingarm bearing, the arms and respective swingarm bearings straddle the base, an inner facet of each arm is rotationally abutted by an adjacent lateral side facet of the base, the swingarm is rotationally connected to the base with a cylindrical fastener received by the swingarm bearings and the base fastener bore, the journaled swingarm bearings are configured to support and laterally secure the swingarm as the swingarm rotates, an elastomeric block is engaged by the base and swingarm, the engaged block fixes an unloaded rotational position of the swingarm relative to the base, the engaged block cushions and dampens swingarm rotation relative to the base, wherein:

the fastener pinches the base and secures the base to the steerer tube, the fastener secures each swingarm bearing to the base, the swingarm rotating about the journaled swingarm bearings, the abutted arms laterally buttressed by the base to restrict swingarm movement to a plane substantially perpendicular to the base fastener bore.

2. The e-stem of claim 1, wherein the e-stem is connected to the steerer tube by the fastener, the fastener is received by the swingarm bearings and the fastener bore of the base, the fastener configured to apply opposing inward axial forces, the forces pinch the base, the fastener connects the swingarm to the base, the fastener connects the base to the steerer tube.

3. The e-stem of claim 2, wherein the base has a split extending rearward from the steerer tube bore, the base fastener bore traverses the split, the base has a base clamp shoulder at each end of the base fastener bore, each base clamp shoulder is configured to receive the respective inward axial force.

4. The e-stem of claim 3, wherein each base side facet is a surface of a rotationally developed arc form, the arc form has a rotational center at the base fastener bore center axis, a surface of each arm inner facet is shaped to rotationally mate with the adjacent base side facet, each arm inner facet rotates against each respective adjacent base side facet, the rotation centered about the base fastener bore axis.

5. The e-stem of claim 4, wherein the swingarm is a rigid singular structure with the arms extending rearward, the swingarm has the handlebar mount at the forward end of the swingarm, each arm has an outer facet.

6. The e-stem of claim 5, wherein the elastomeric block has an unloaded shape, the engaged elastomeric block is elastically deformed as the swingarm rotates from the unloaded rotational position, the rotation caused from externally applied impact forces and vibrations, said impact forces and vibrations are cushioned and dampened by the elastic deformation of the elastomeric block.

7. The e-stem of claim 6, wherein the elastomeric block has elastic physical properties, the properties allowing said block to resist, deform, and rebound from externally applied forces.

8. The e-stem of claim 7, wherein the fastener has two opposing end elements, one element at each swingarm bearing, each end element comprised of cylindrical forms configured to support and laterally fix each respective swingarm bearing, each end element configured to apply the respective inward axial force, each end element and respective swingarm bearing configured to transmit each respective inward axial force to the respective base clamp shoulder, the forces pinch the base.

9. The e-stem of claim 8, wherein each arm inner facet rotationally glides against the respective adjacent base side facet, the rotation assisted by glide surfaces, the glide surfaces located between, or on, the arm inner facets and respective base side facets, the glide surfaces reducing friction between the arm inner facets and respective base side facets thereby resisting rotational thrust loads, said glide surfaces having sufficient hardness to resist wear from repetitive rotation of the swingarm relative to the base.

10. The e-stem of claim 9, wherein the base has a top facet and a bottom facet, the top facet configured to receive the abutment of a stem top cap of the prior art, wherein the base may optionally have one or more transverse pinch bolts of the prior art.

11. The e-stem of claim 10 wherein an assembled e-stem is installed and secured to the steerer tube, the cushioned swingarm rotation of the installed e-stem absorbs road impacts and vibrations transmitted from a wheel of the cycle fork to the steerer tube, the buttressed swingarm provides a laterally rigid connection between the fork and handlebar mount.

12. An elastomeric stem, referred to as an e-stem, connects a cycle handlebar to a cycle fork steerer tube, the e-stem comprised of:
a pinchable base with a split vertical steerer tube bore receives the steerer tube, the base is secured to the steerer tube by pinching the base with a fastener,
an swingarm with a transverse handlebar mount at a forward end and two arms at a rearward end, the swingarm rotationally connected to the base at a pivot point located rearward of the steerer tube bore,
an elastomeric block engaged by the base and swingarm, the engaged block fixes an original rotational position of the swingarm relative to the base, the engaged block cushions swingarm rotation relative to the base, wherein:
the engaged elastomeric block has primary engagements with the base and swingarm, the block has secondary engagements with the base and swingarm, the primary engagements affect upward or downward swingarm position and rotation relative to the base, the secondary engagements affect downward swingarm position and rotation relative to the base.

13. An elastomeric stem, referred to as an e-stem, connects a cycle handlebar to a cycle fork steerer tube, the e-stem comprised of:
a pinchable base with a split vertical steerer tube bore receives the steerer tube, the base is secured to the steerer tube by pinching the base with a fastener,
a swingarm with a transverse handlebar mount at a forward end and two arms at a rearward end, the swingarm rotationally connected to the base at a pivot point located rearward of the steerer tube bore,
an elastomeric block engaged by the base and swingarm, the engaged block fixes the rotational position of the swingarm relative to the base, the engaged block cushions swingarm rotation relative to the base.

* * * * *